(12) United States Patent
Radovinsky

(10) Patent No.: US 9,875,826 B2
(45) Date of Patent: Jan. 23, 2018

(54) FIELD MAKEABLE CRYOSTAT/CURRENT CONNECTIONS FOR AN HTS TAPE POWER CABLE

(71) Applicant: Novum Industria LLC, New York, NY (US)

(72) Inventor: Alexey Radovinsky, Cambridge, MA (US)

(73) Assignee: Novum Industria LLC, New York, NY (US)

( * ) Notice: Subject to any disclaimer, the term of this patent is extended or adjusted under 35 U.S.C. 154(b) by 54 days.

(21) Appl. No.: 14/939,376

(22) Filed: Nov. 12, 2015

(65) Prior Publication Data

US 2016/0141079 A1     May 19, 2016

Related U.S. Application Data

(60) Provisional application No. 62/079,993, filed on Nov. 14, 2014.

(51) Int. Cl.
| | | |
|---|---|---|
| *H01B 12/00* | (2006.01) | |
| *H01B 12/02* | (2006.01) | |
| *H01B 12/16* | (2006.01) | |
| *H02G 15/08* | (2006.01) | |

(Continued)

(52) U.S. Cl.
CPC ............. *H01B 12/02* (2013.01); *H01B 12/16* (2013.01); *H01R 4/68* (2013.01); *H02G 15/08* (2013.01); *H02G 15/34* (2013.01)

(58) Field of Classification Search
CPC .......... H02K 11/33; H02K 5/225; H02K 5/10; H01R 43/005; H01R 43/20; H01R 13/4361; H01R 13/4364; H01R 13/5213; H01R 13/41; H01R 13/521; H01R 13/2428;

(Continued)

(56) References Cited

U.S. PATENT DOCUMENTS 3,694,914 A * 10/1972 Aupoix ................. H01B 12/14
                                                           138/113
4,011,732 A *  3/1977 Doherty ................ F16L 59/184
                                                           285/148.2

(Continued)

OTHER PUBLICATIONS

International Search Report and Written Opinion dated Feb. 1, 2016 in corresponding PCT application No. PCT/US2015/060514.

*Primary Examiner* — Amy Cohen Johnson
*Assistant Examiner* — Milagros Jeancharles
(74) *Attorney, Agent, or Firm* — Nields, Lemack & Frame, LLC

(57) ABSTRACT

A method of connecting prefabricated pieces of an HTS cable onsite is disclosed. This quick and reliable procedure of connecting pieces of HTS cable adds to the flexibility of designing and installing power transmission and distribution grids. The joint can also be dissembled such that it can be dismantled for replacing the cable on one side of the connection. The joint can then be reassembled with a new cable in its place. This facilitates repairing the electrical grid in case of local damage to the cable, as well as reconfiguring the grid in case this is required. The complexity of creating demountable HTS cable joints is due to the necessity to create and maintain continuity of several media across the joint along the length of the cable. Various combinations of design options satisfying these requirements are possible.

19 Claims, 8 Drawing Sheets

(51) Int. Cl.
*H01R 4/68* (2006.01)
*H02G 15/34* (2006.01)

(58) Field of Classification Search
CPC .......... H01R 4/68; H01B 12/02; H01B 12/16; H02G 15/08; H02G 15/34
USPC ................. 505/163, 230–239, 434; 324/318; 174/15.4, 15.5, 36, 125.1; 62/6, 50.7
See application file for complete search history.

(56) References Cited

U.S. PATENT DOCUMENTS

| | | | | |
|---|---|---|---|---|
| 4,283,079 A * | 8/1981 | Flaherty | .................. | B23P 11/02 285/381.2 |
| 4,491,347 A * | 1/1985 | Gustafson | ............. | F16L 59/141 285/353 |
| 4,894,906 A * | 1/1990 | Huang | .................... | H01L 39/02 174/94 R |
| 5,051,397 A * | 9/1991 | Sato | ........................ | B23K 35/26 257/662 |
| 5,253,675 A * | 10/1993 | Ooshio | .................... | F16L 29/04 137/614.05 |
| 5,306,052 A | 4/1994 | McGushion | | |
| 5,522,226 A * | 6/1996 | Mruzek | .................. | F25D 19/006 165/185 |
| 6,134,893 A * | 10/2000 | Bonn | ................... | F16L 27/0828 285/47 |
| 7,052,047 B1 * | 5/2006 | Box | ....................... | F16L 37/248 285/123.15 |
| 7,371,968 B1 | 5/2008 | Hennessy | | |
| 8,069,675 B2 * | 12/2011 | Radovinsky | .......... | F25D 19/006 62/6 |
| 8,354,592 B2 * | 1/2013 | Jang | ........................ | H01R 4/68 174/125.1 |
| 8,517,749 B2 * | 8/2013 | Marshall | ................ | F16L 25/01 285/123.15 |
| 8,658,891 B2 * | 2/2014 | Choi | ........................ | H01R 4/68 174/19 |
| 2004/0256141 A1 * | 12/2004 | Fujikami | ................ | H01B 12/02 174/125.1 |
| 2005/0067184 A1 | 3/2005 | Jang | | |
| 2005/0217878 A1 | 10/2005 | Ashibe et al. | | |
| 2008/0086878 A1 | 4/2008 | Ashibe | | |
| 2008/0180202 A1 | 7/2008 | Otto et al. | | |
| 2009/0272127 A1 * | 11/2009 | Radovinsky | .......... | F25D 19/006 62/50.7 |
| 2010/0087101 A1 | 4/2010 | Lallouet et al. | | |
| 2010/0199689 A1 | 8/2010 | Choi et al. | | |
| 2012/0108435 A1 | 5/2012 | Ichiki et al. | | |
| 2013/0199821 A1 * | 8/2013 | Teng | ...................... | H02G 15/34 174/125.1 |

\* cited by examiner

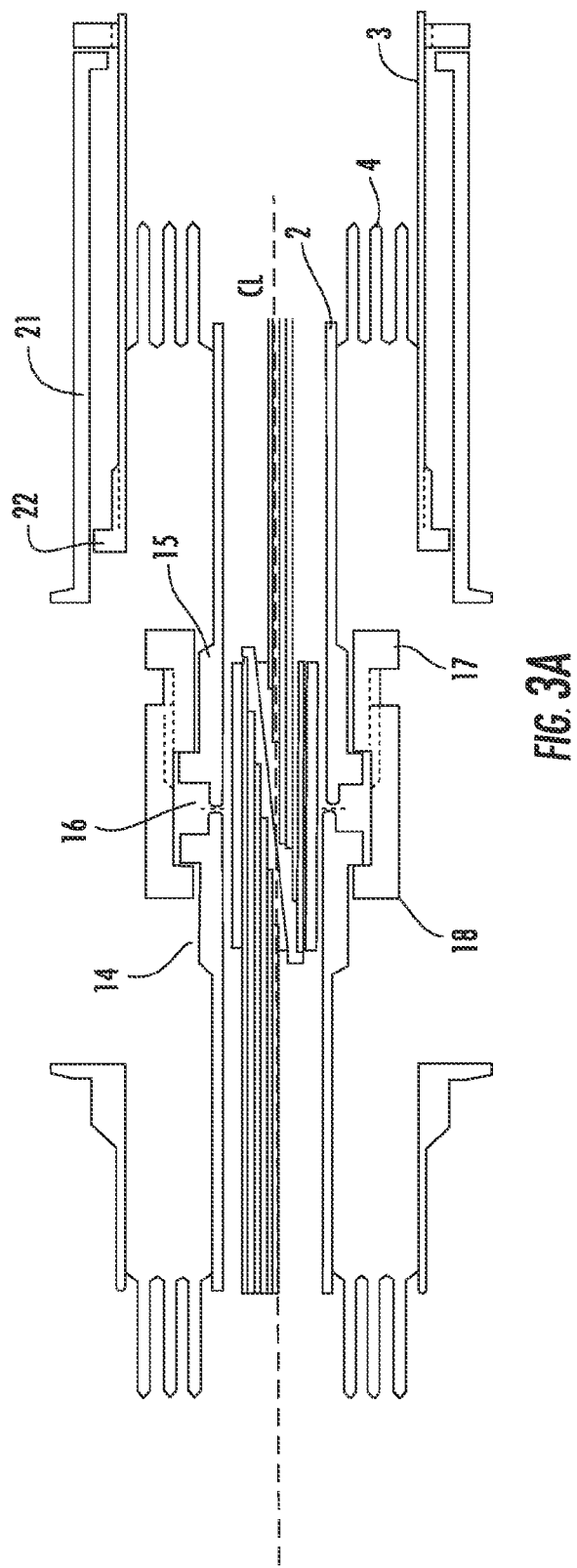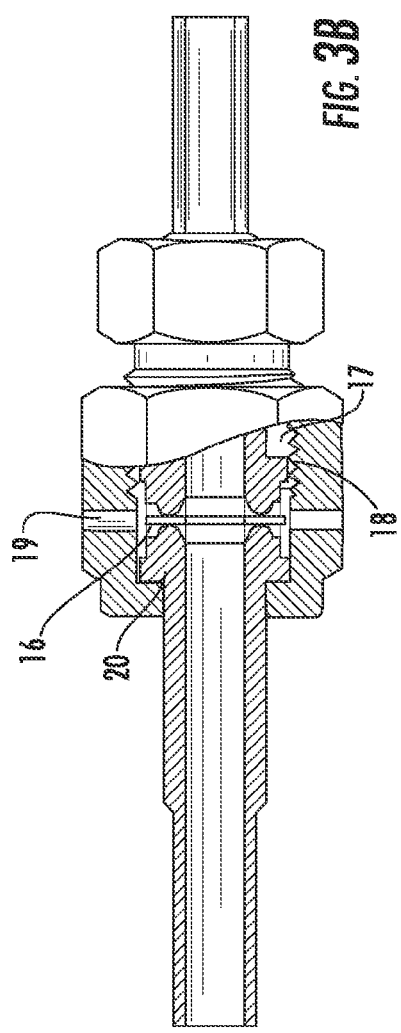

| TUBE SOCKET SIZE | VCR SIZE | ORDERING NUMBER | DIMENSIONS | | | | WORKING PRESSURE | | |
|---|---|---|---|---|---|---|---|---|---|
| | | | A | D | E | Tx | Ni | SS | Cu |
| | | DIMENSIONS, in. (mm) | | | | | psig (bar) | | |
| 1/16 | 1/8 | SS-1-VCR-3 ① ② | 0.70 (17.8) | 0.10 (2.5) | 0.05 (1.3) | 0.13 (3.3) | 9000 (620) | 9000 (620) | 7200 (496) |
| 1/8 | 1/8 | SS-2-VCR-3 ② | 0.70 (17.8) | 0.10 (2.5) | 0.09 (2.3) | 0.20 (5.1) | 7100 (489) | 7100 (489) | 7100 (489) |
| 1/4 | 1/4 | SS-4-VCR-3 | 1.31 (33.3) | 0.28 (7.1) | 0.18 (4.6) | 0.35 (8.9) | 5500 (378) | 5500 (378) | 5500 (378) |
| 3/8 | 1/2 | SS-6-VCR-3 ③ | 1.50 (38.1) | 0.31 (7.9) | 0.28 (7.1) | 0.60 (15.2) | 3500 (241) | 4300 (296) | 2800 (192) |
| 1/2 | 1/2 | SS-8-VCR-3 | 1.50 (38.1) | 0.38 (9.6) | 0.40 (10.2) | 0.60 (15.2) | 3000 (206) | 3000 (206) | 2400 (165) |
| 5/8 | 5/8 | SS-10-VCR-3 | 1.56 (39.6) | 0.41 (10.4) | 0.50 (12.7) | 0.72 (18.3) | 2800 (192) | 2800 (192) | 2200 (151) |
| 3/4 | 3/4 | SS-12-VCR-3 | 2.00 (50.8) | 0.44 (11.2) | 0.62 (15.7) | 0.88 (22.4) | 2800 (192) | 2800 (192) | 2200 (151) |
| 1 | 1 | SS-16-VCR-3 | 2.22 (56.4) | 0.62 (15.7) | 0.87 (22.1) | 1.19 (30.2) | 2400 (165) | 3000 (206) | 1900 (130) |

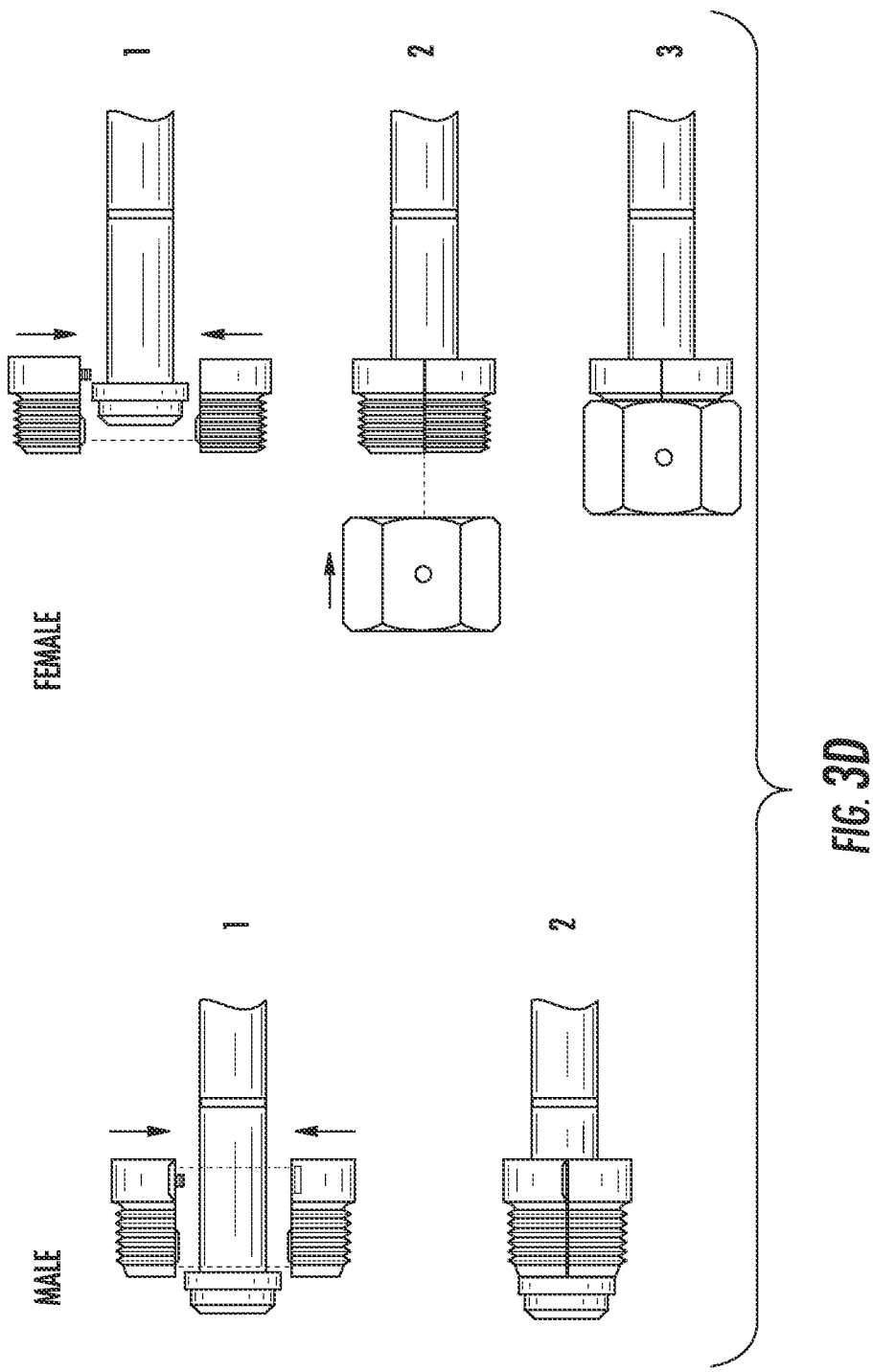

1

FIELD MAKEABLE CRYOSTAT/CURRENT CONNECTIONS FOR AN HTS TAPE POWER CABLE

This application claims priority of U.S. Provisional Patent Application Ser. No. 62/079,993, filed Nov. 14, 2014, the disclosure of which is incorporated herein by reference in its entirety.

FIELD

Embodiments of the present disclosure relate to a field makeable connection, and more particularly to making a connection between two sections of a high temperature superconductor (HTS) cable.

BACKGROUND

The beginning of power cable industry is usually attributed to the first New York City distribution system, created by Thomas Edison. This system used copper rods for the conductors. Fast development of industrial power grids in the twentieth century resulted in development of sophisticated engineering methods of power transmission using high current and high voltage power cables. Current state of the art power cables represent a highly optimized composition of wires made of low-resistivity metals, copper, aluminum and special alloys. Though low, the finite resistivity of such power cables leads to significant power losses in the power distribution and transmission lines. In the United States, estimated transmission and distribution losses are about 6%.

Recent advances in superconducting (SC) technology created new opportunities for developing new approaches to the power transmission and distribution. Low and high temperature superconductors were considered for various components of power grids, such as power switches, fault current limiters and AC transformers. Studies showed that low temperature superconductors cannot be feasibly used for commercial applications because the AC losses at cryogenic temperatures imply that the cryogenic cooling costs make the whole device uneconomic. On the other hand, the same kind of devices, made instead using high temperature superconductors (HTS), may be both practical and economically justifiable for the commercial utilization.

The most promising field for commercialization of HTS technology is its use for manufacturing power transmission and distribution cables. Several national and international projects with a goal of designing and integrating HTS power cables into experimental and existing power transmission systems are currently underway. Various HTS cable designs comprised of strands, or using Roebel, CORC and stacked tape structure, are being considered. Analytical and experimental studies show that HTS cables using CORC and stacked tape twisted topologies present better combinations of characteristics for power transmission and distribution.

One issue that arises when attempting to characterize the practicality of using these cables lies in design and implementation of the terminations, such as, for example, the connections of the SC cables to mate to normal conductor bus bars, as well as joints between two pieces of SC cables. The significance of the latter issue is due to the fact that superconducting filaments and tapes are produced in pieces, where the length of these pieces is limited by technical conditions and may be shorter than needed for a particular application. Various designs of HTS stacked tape terminations and joints have been presented. The peculiarity of these connections is that they are permanent. In other words, once made, these connections are not expected to be disconnected and reconnected afterwards.

Therefore, a system and method of creating connecting between sections of HTS cable that can be completed in the field would be beneficial. Further, it would be advantageous if these connections could be demountable, such that the pieces of the cable may be replaced or rearranged as needed.

SUMMARY

The present disclosure permits connecting prefabricated pieces of an HTS cable onsite. This quick and reliable procedure of connecting pieces of HTS cable adds to the flexibility of designing and installing power transmission and distribution grids. The joint can also be dissembled such that it can be dismantled for replacing the cable on one side of the connection. The joint can then be reassembled with a new cable in its place. This facilitates repairing the electrical grid in case of local damage to the cable, as well as reconfiguring the grid in case this is required. The complexity of creating demountable HTS cable joints is due to the necessity to create and maintain continuity of several media across the joint along the length of the cable. The joint has to support continuous flow of current in the conductor and cryogenic coolant in the cryogenic space. The joint must also maintain vacuum in the heat insulation space between the outer wall of the cryostat and the boundary of the cryogenic space of the conductor. Various combinations of design options satisfying these requirements are possible.

BRIEF DESCRIPTION OF THE FIGURES

For a better understanding of the present disclosure, reference is made to the accompanying drawings, which are incorporated herein by reference and in which:

FIG. 3A shows a second connection step according to one embodiment;

FIG. 3B shows the general features of a VCR fitting;

FIG. 3D shows an optional design with split nuts;

DETAILED DESCRIPTION

As described above, one issue associated with the use of HTS cables in the electrical grid is the coupling and decoupling of sections of HTS cable together. This should preferentially be achieved in a way that is easy, such that it may be accomplished in the field. Further, the joint should be demountable, allowing it to be disassembled in the event that one or both HTS cables need to be replaced. The present disclosure discloses a device and a method that enables these actions.

One purpose of the disclosed device, also referred to as a connection, is to connect two HTS stacked tape cables with prefabricated in the shop terminations onsite.

Figure 1:
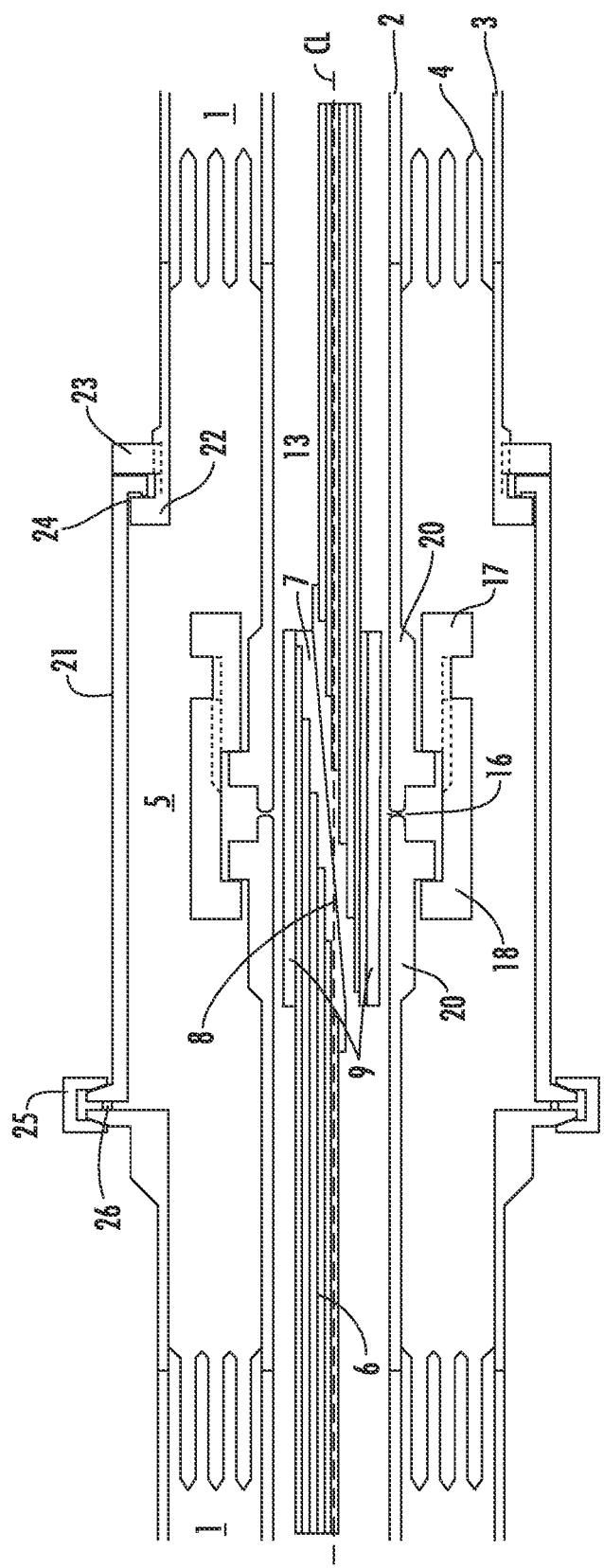
FIG. 1 shows an illustration of the field makeable cable connection according to one embodiment.

FIG. 1 depicts a general layout of the connection. It is comprised of 3 separate joints:
- an electrical joint for connecting two cables formed by stacked HTS tapes;
- a first coupling to enclose a cryogenic space with a forced flow of cryogenic coolant for cooling HTS tapes; and
- a second coupling to enclose a vacuum space thermally insulating the inner wall containing the cryogenic space from the Room Temperature (RT) outer wall of the cryostat.

The electrical joint may be disposed in the center of the connection. The cryogenic space envelops the electrical joint, while the vacuum space is disposed around the cryogenic space.

Further, the vacuum space is comprised of two parts. Cable vacuum space 1 of the prefabricated cable is disposed between two coaxial corrugated cylindrical shells and is contained in the axial direction by a partition made in a form of a bellows 4 to reduce the heat transfer between the room temperature (RT) outer wall 3 and the cryogenic inner wall 2. The inner wall 2 seals the cryogenic space, while the outer wall 3 of the cable cryostat seals the vacuum space 1. The cable vacuum space 1 is sealed and evacuated at the cable manufacturing facility. Vacuum space of the joint 5 is sealed and evacuated as part of the procedure of connecting the cables in the field, as will be discussed in more details below.

Figure 2A:
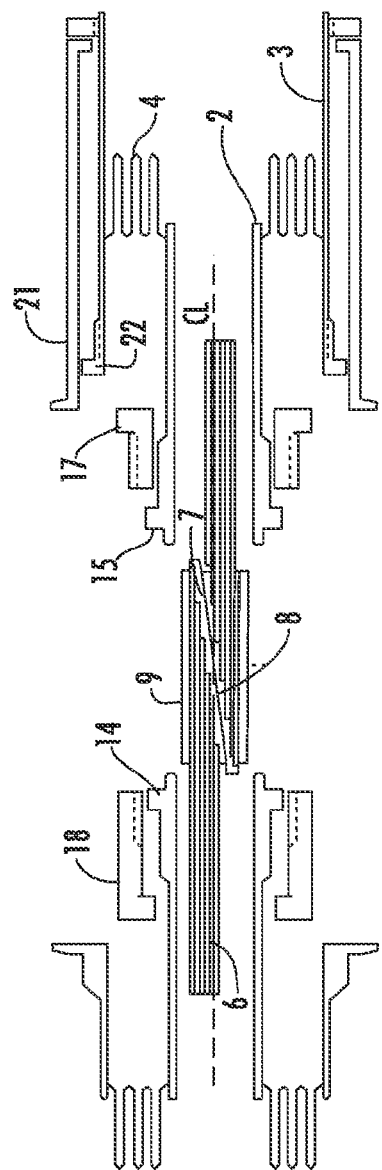
FIGS. 2A-2C shows various views of an electrical joint that is employed according one embodiment.
Figure 2C:
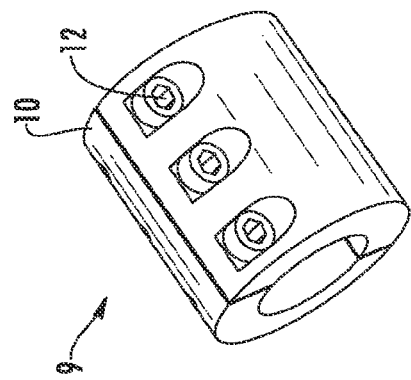
Figure 2B:
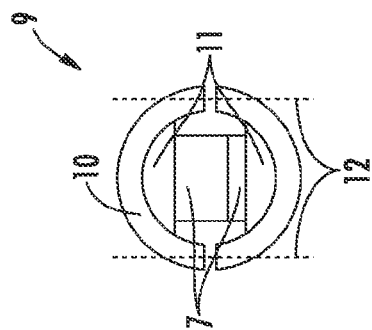

The three joints are connected in the following sequence. Step 1—Connecting the cables starts by manufacturing an electrical joint, as shown in FIG. 2A. At each end of the cable, the tapes of the stack taped HTS cable 6 are cut to form steps. The step-shaped stack is soldered into a wedge-shaped copper matrix 7 so that the superconducting (SC) side of the tape faces the side of the copper matrix, which will face the respective surface of the other cable. This shall be done at the cable manufacturing facility. While copper is disclosed, other conductive materials may also be used. The ends of the two cables are inverted with respect to one another such that there is an overlapping region, as shown in FIG. 2A. In the field, both wedged terminations of the cables are compressed against each other with a thin layer of indium 8 inserted between them and tightened using an electrical clamp, or E-clamp 9. Possible designs of the E-clamp are shown in FIGS. 2B and 2C. The E-clamp 9 comprises two annular clamps 10 which compress the assembly of the wedge-shaped copper matrices 7 using spacers 11. The compression is due to the force developed by the tightening bolts 12. This step creates the electrical joint. Step 2—The next step is closing the cryogenic space 13 of the cryogenic coolant flow. This can be accomplished by using seal fittings of various designs. One such filling is the standard commercially available Vacuum Coupling Radiation (VCR) Metal Gasket Face Seal Fittings. During Step 1, as shown in FIG. 2A, the left side 14 and the right side 15 of the cable cryostat (i.e. inner wall 2) were driven apart to give access to the ends of the cable, allowing them to be connected using the E-clamp 9. This assumes that the cables have to be longer than the cryostat to permit this to happen. Now the sides of the cryostat (i.e. inner wall 2) have to be drawn together, so that the glands of the VCR fitting with a metal gasket disposed between them could be tightened together by the male nut 17 and the female nut 18, as shown in FIG. 3A. This connection is fluid tight.

Testing with VCR fittings shows that they were reliably used to seal liquid helium flows at 4.3 K and pressure up to 10 bar. In these fittings, silver plated stainless steel gaskets were used. It is expected that, for the cryogenic coolant flow, other types of metal gaskets, such as but not limited to copper, will work as well. The one advantage of this type of fitting is that it is standard for the industry. For example, Swagelok is known to be a reliable provider of cryogenic flow sealings. These fittings are rated up to the pressure of 165 bar for a 1.0" fitting (22 mm hole) at room temperature and up to 3000 bar for ¾" fittings (15 mm hole). The fittings are helium leak tested to a maximum leak rate of $4 \times 10^{-9}$ std $cm^3$/s with silver plated and copper gaskets and to leak rate of $4 \times 10^{-11}$ std $cm^3$/s with unplated gaskets.

FIG. 3B shows an enlarged view of the general features of a VCR fitting. A male nut 17 and female nut 18 are used to clamp the joint 16 together. Note that test ports 19 exist, allowing for easy leak testing. This leak testing may be performed at the end of Step 2.

Figure 3C:
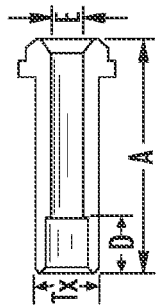
FIG. 3C shows dimensions of commercially available glands.

FIG. 3C shows dimensions of the available glands. The one in the last row, SS-16-VCR-3, corresponds to the maximum ID of the gland in the catalog. This limits the OD of the E-clamp 9 of the electrical connection to less than 22.1 mm. Note that some space should be left between the OD of the E-clamp 9 and the ID of the gland to allow the flow of the cryogenic coolant. Dimensions of the gaskets and the tightening nuts are not shown here. They are available to match the size of the gland.

The above descriptions presumed that the male nut 17 and the female nut 18 were installed on the glands 20 during the prefabrication of the terminations of the cables at the cable manufacturing facility. FIG. 3D shows an optional design with split nuts. In this case, both nuts can be installed on the glands as part of Step 2 of the final assembly of the connection in the field.

Figure 4A:
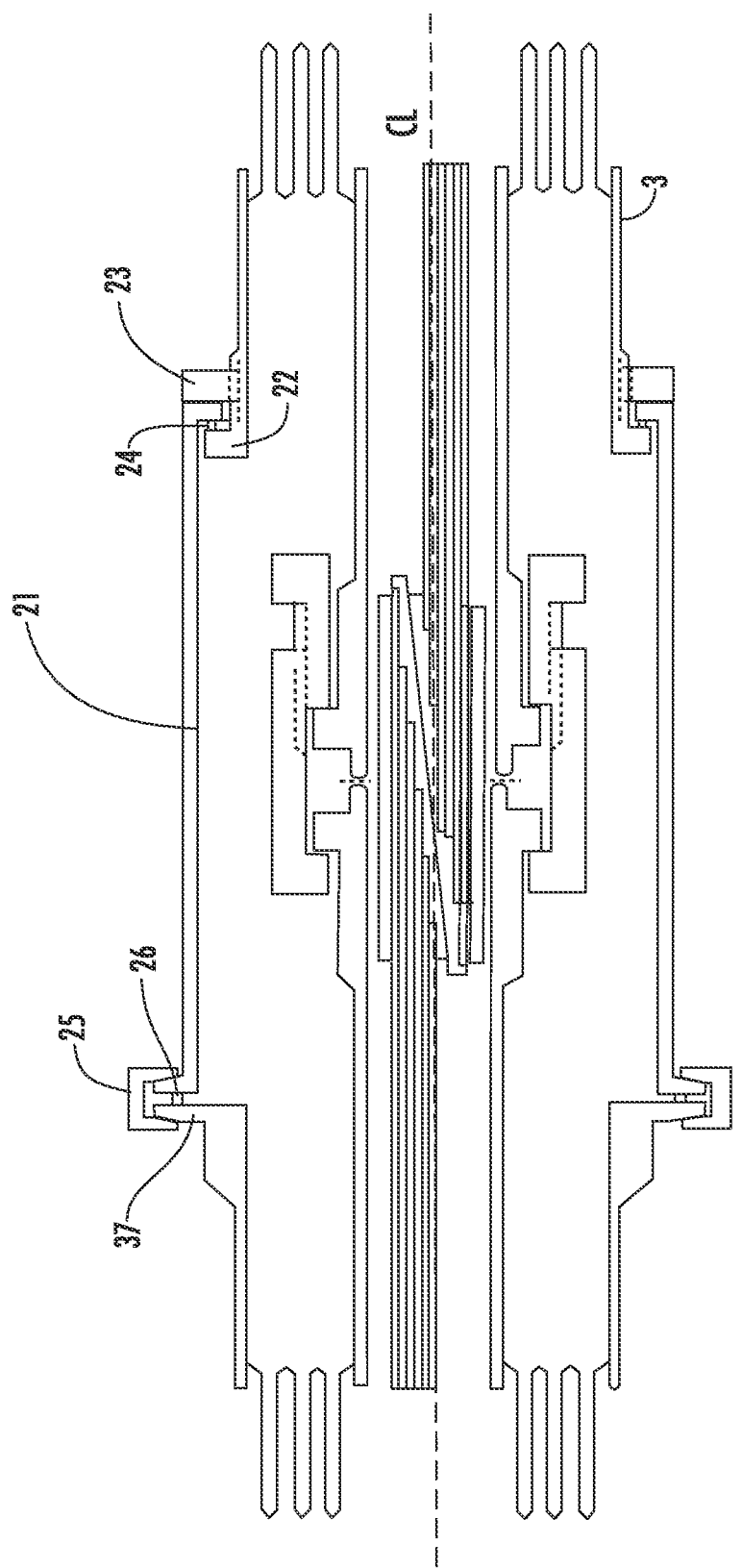
FIG. 4A shows a third connection step according to one embodiment.

Step 3—The last step is closing the vacuum space of the joint as shown in FIG. 4A. The cylindrical extender 21 was moved during Steps 1 and 2 (see FIGS. 2A and 3A) to the right position to open the working space for closing the VCR fitting. The cylindrical extender 21 will now be slid to its working position. On the right end, it will be pressed to the step 22 on the cryostat by a tightening nut 23. A rubber o-ring 24 will be installed to seal this interface. On the left end, flanges 37 are disposed on the end of the cylindrical extender 21 and the outer wall 3. The vacuum seal will be provided by a V-band clamp 25 with a second rubber o-ring 26 between the flanges 37.

The cryogenic tubes and the fitting are wrapped with a multi layer insulation (MLI), which may be double aluminized Mylar, to reduce a heat load from room temperature to the cold cryogen flow. A charcoal (or other type) getter is attached to the outer surface of the cryogenic coolant tubes to increase cryopumping (i.e. condensation of a gas on a cryogenically cooled surface to produce vacuum) of the vacuum space when the cryogen tubes have a temperature below 80 K. The use of a getter avoids the preliminary pump out of the vacuum space in the field. Consequently, a pump out port is not shown in the figures.

Figure 4B:
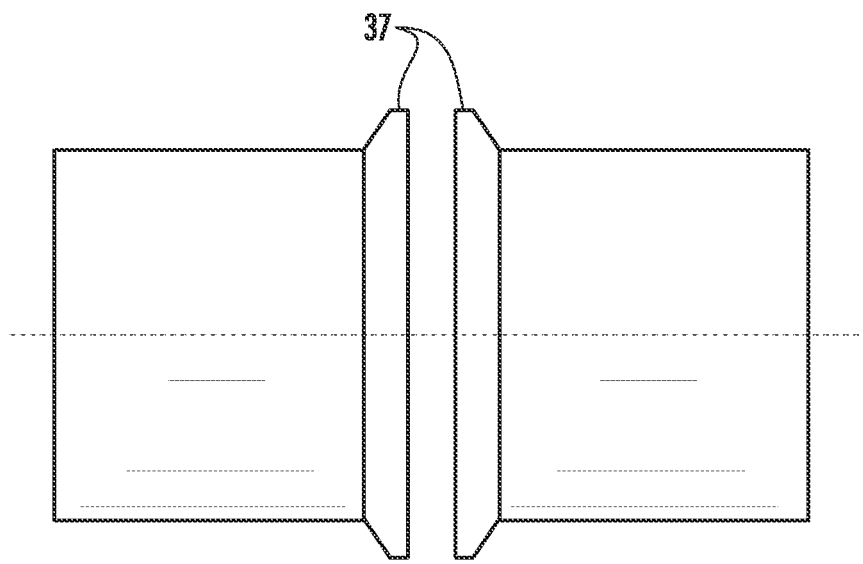
FIG. 4B shows commercially available flanges for V-band clamps.
Figure 4C:
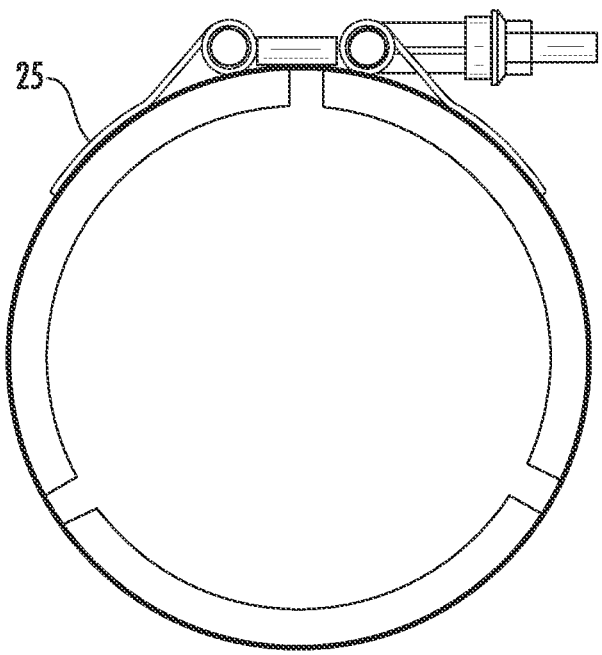
FIG. 4C shows a V-band clamp that may be used with certain embodiments.

FIGS. 4B and 4C depict possible implementations of the flanges 37 and the V-band clamp 25, respectively, which can be used for this seal.

As described above, the disclosed connection may be disassembled and reassembled. To disassemble this connection, each of the three joints must be separated. This is preferably done by performing the Steps 1-3 in the reverse order. In other words, Step 3, which seals the vacuum space, is performed. In this case, the V-band clamp 25 is removed, and the cylindrical extender 21 is moved to one side of the outer wall 3. After this, the male nut 17 and the female nut 18 are unscrewed to open the cryogenic space 13. Finally, the E-clamp 9 is removed, exposing the HTS cable 6. The HTS cable is then pulled apart, completing the separation of the two parts. When being reassembled, it is preferable to remove and replace certain components. For example, the thin layer of indium 8 may be removed and replaced prior to performing Step 1. Additionally, it may be advisable to replace all O-rings and gaskets.

It has been shown that the joint contact resistance is inversely proportional to the square root of the product of normal pressure and area in the contact and is directly proportional to the square root of the hardness of the softer material forming the interface. This justifies the requirement for the E-clamp to apply normal pressure and for a substantial length of the electrical joint, as well as for placing a thin layer of soft and good conductor, indium, between the copper surfaces of the wedge-shaped copper matrices.

Figure 5:
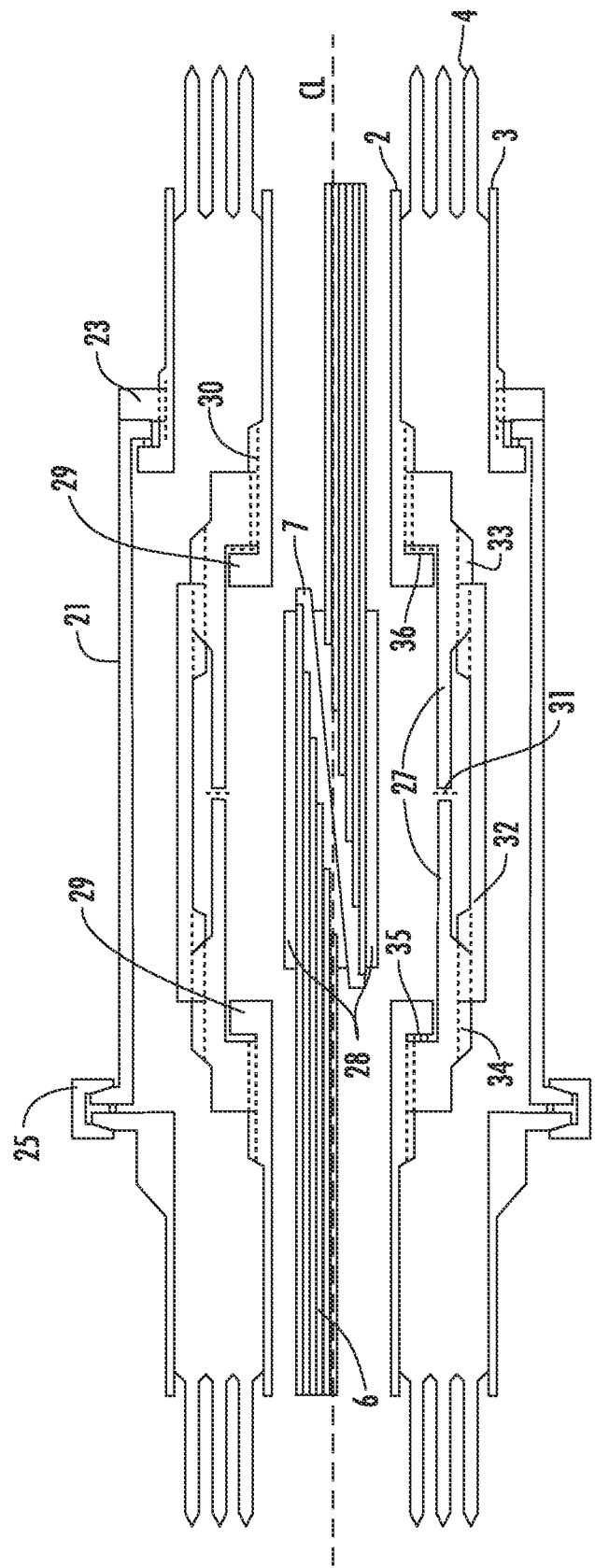
FIG. 5 shows an alternative embodiment.

Also, as explained in Step 2, the above design presumes that the cable has to be longer than the cryostat. This fact, as well as the difference in thermal contractions between the cable and the cryostat during cooldown, means that the conductor cable will have to be moved with respect to the inner wall of the cryostat. This may or may not present a technical problem. However, if this feature is not desirable, an alternative design, shown in FIG. 5, can be considered.

This design uses a different fitting than that described in Step 2 to close the cryogen space. The glands 27 are made as separate pieces, which during Step 1, are driven apart to give access to the E-clamp 28. During Step 2, the glands 27 are bolted on the threads of the flanges 29 at the termination of the cryogen coolant cryostat 30 (i.e. the inner wall) with an indium gasket 31 sealing these connections. Then, a tensioning bolt 32 with opposite left and right threads 33, 34 at the left and right ends will be used to tension the fitting between the glands with a metal gasket 31 preinstalled between them. Indium or soft copper gaskets 35, 36 are used to provide a possibility of compressing the gland's hard metal gasket.

An advantage of this design is that there is no need to move the conductor with respect to the inner wall of the cryostat. However, this design will require a custom made fitting and will add two indium gaskets. Leak testing can be performed in a similar way to how it is depicted in FIG. 3B.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A connection for use with superconducting cables, each cable comprising stacked high temperature superconducting (HTS) tapes covered by an inner wall, which in turn, is covered by an outer wall, the connection comprising:
    an electrical joint for connecting a first cable and a second cable;
    a first coupling to enclose a cryogenic space disposed inside the inner wall; and
    a second coupling to enclose a space between the inner wall and the outer wall, wherein the second coupling comprises:
        a cylindrical extender disposed between the outer walls of the first cable and the second cable;
        a step disposed on the outer wall of the first cable to secure the cylindrical extender to the first cable; and
        a V-band clamp securing the cylindrical extender to the second cable.

2. The connection of claim 1, wherein the stacked HTS tapes have a step-shaped end, and wherein the electrical joint comprises:
    a copper matrix disposed on the end of each step-shaped stack of HTS tapes;
    a thin layer of indium disposed between the copper matrices; and
    an electrical clamp compressing the HTS tapes together.

3. The connection of claim 2, wherein the step-shaped end of the first cable is inverted with respect to the step-shaped end of the second cable so as to form an overlapping region.

4. The connection of claim 1, wherein the first coupling comprises a seal fitting to attach the inner wall of the first cable and the inner wall of the second cable.

5. The connection of claim 1, wherein the second cable comprises a first flange on its outer wall and the cylindrical extender comprises a second flange, whereby the V-band clamp holds the first flange and second flange together.

6. The connection of claim 1, wherein each cable further comprises bellows connecting the inner wall and the outer wall so as to enclose a vacuum space.

7. A method of assembling two superconducting cables, where each cable comprises stacked high temperature superconducting (HTS) tapes covered by an inner wall, which in turn, is covered by an outer wall, wherein an end of the stacked HTS tapes is formed in a step shape and soldered with a conductive matrix, the method comprising:
    electrically coupling the ends of the stacked HTS tapes together;
    coupling the inner wall of a first cable to the inner wall of the second cable, after electrically coupling the stacked HTS tapes; and
    coupling the outer wall of the first cable to the outer wall of the second cable, after coupling the inner walls together, wherein coupling the outer wall of the first cable to the outer wall of the second cable comprises:
        disposing a cylindrical extender between the outer wall of the first cable and the outer wall of the second cable; and
        attaching the cylindrical extender to the outer wall of the second cable using a V-band clamp.

8. The method of claim 7, wherein electrically coupling the ends of the stacked HTS tapes comprises:
    arranging the step shaped ends of the stacked HTS tapes so that the ends are inverted with respect to each other to create an overlapping region;
    applying a thin layer of indium between the conductive matrices; and
    disposing an electrical clamp around the overlapping region; and compressing the ends by tightening bolts in the electrical clamp.

9. The method of claim 8, wherein the stacked HTS tapes are longer than the inner wall, such that the stacked HTS tapes are exposed during the electrically coupling.

10. The method of claim 7, wherein coupling the inner wall comprises:

using a seal fitting to attach the inner wall from the first cable to the inner wall from the second cable; and tightening a male nut and a female nut to securely couple the inner wall from the first cable to the inner wall from the second cable.

11. The method of claim 10, further comprising performing leak testing after tightening the male nut and the female nut.

12. The method of claim 10, wherein the male nut and the female nut were installed on the inner wall during an initial fabrication of the cable.

13. The method of claim 10, wherein the male nut and the female nut are split nuts, and wherein the male nut and the female nut are installed prior to tightening the male nut and the female nut.

14. The method of claim 7, wherein the outer wall of the second cable has a first flange and the cylindrical extender comprises a second flange on its end, and the V-band clamp secures the first flange and the second flange.

15. The method of claim 7, wherein the outer wall of the first cable has a step which holds the cylindrical extender in place.

16. The method of claim 7, further comprising disassembling the two superconducting cables, by:

decoupling the outer wall of the first cable from the outer wall of the second cable;

decoupling the inner wall of a first cable from the inner wall of the second cable; and electrically disconnecting the ends of the stacked HTS tapes.

17. A method of assembling two superconducting cables, where each cable comprises stacked HTS tapes covered by an inner wall, which in turn, is covered by an outer wall, wherein an end of the stacked HTS tapes is formed in a step shape and soldered with a conductive matrix, the method comprising:

electrically coupling the ends of the stacked HTS tapes together;

coupling the inner wall of a first cable to the inner wall of the second cable, after the electrically coupling;

coupling the outer wall of the first cable to the outer wall of the second cable, after coupling the inner walls together, wherein coupling the inner wall comprises:

using a seal fitting to attach the inner wall from the first cable to the inner wall from the second cable; and tightening a male nut and a female nut to securely couple the inner wall from the first cable to the inner wall from the second cable; and performing leak testing after tightening the male nut and the female nut.

18. The method of claim 17, wherein the male nut and the female nut were installed on the inner wall during an initial fabrication of the cable.

19. The method of claim 17, wherein the male nut and the female nut are split nuts, and wherein the male nut and the female nut are installed prior to tightening the male nut and the female nut.

* * * * *